Nov. 27, 1956  D. R. TRINKLE  2,771,807
TOOL HOLDER
Filed Jan. 22, 1953

INVENTOR
DALLAS R TRINKLE
BY Allen A. Dicke, Jr.
AGENT

United States Patent Office 2,771,807
Patented Nov. 27, 1956

2,771,807

TOOL HOLDER

Dallas R. Trinkle, Cincinnati, Ohio, assignor to The Monarch Machine Tool Company, a corporation of Ohio Application January 22, 1953, Serial No. 335,355

1 Claim. (Cl. 82—36)

It is an object of this invention to provide a strong, durable, rigid tool holder for lathes, planers, shapers, and other machine tools.

It is another object to provide a versatile tool holder which can selectively support any one of a plurality of tools or other implements.

It is a further and more specific object to provide a tool holder which can selectively support a cutting tool or a forming tool, or even a dial indicator.

It is another object to provide a tool holder upon which different types of tools and implements may be selectively supported for ready and rapid interchangeability.

Generally, the structure according to this invention comprises a base which may be fastened to the usual tool slide or other portion of a machine tool. Upon this base is a fastening means which can rigidly support a bar on the base. Several bars may be provided, each one of which may support an implement for use on the machine tool. One of these bars may support a cutting tool, another a forming tool, and yet another may support a dial indicator. The machine operator may easily place any one of the bars on the base, use the implement attached thereto, remove the bar and rapidly place another bar, carrying an implement, into position.

The drawings which show the subject matter of this invention are intended to be illustrative, for many modifications of the physical structure may be made without departing from the inventive concept of this invention.

In the drawings—

Figure 2:
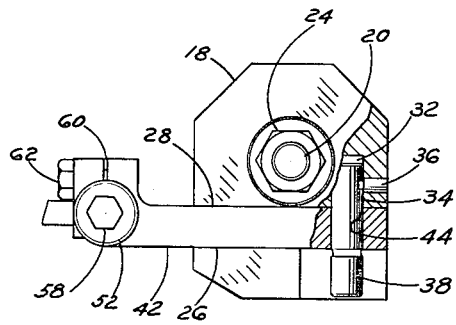
Figure 2 shows a top view with parts broken away of the tool holder.
Figure 1:
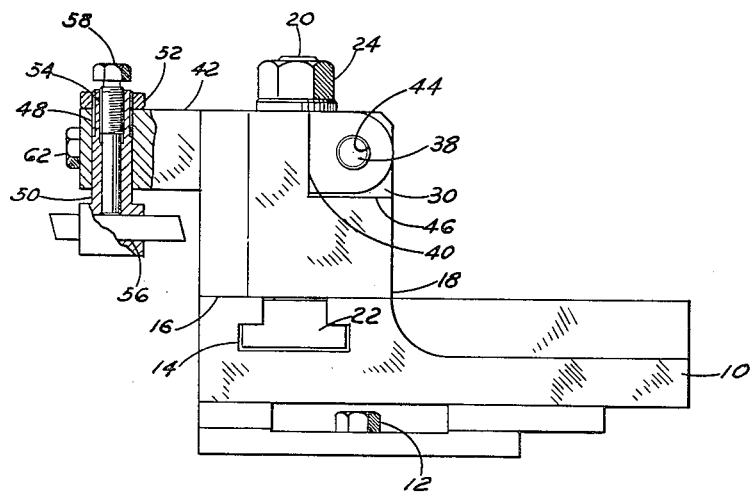
Figure 1 shows a side view of my tool holder as fastened to a machine tool tool slide. Parts are broken away to show certain internal construction.

Referring to Figures 1 and 2 of the drawing, a tool slide of a machine tool is shown at 10. This tool slide is fastened down to the machine tool in the usual manner such as by bolts 12. The tool slide may or may not be angularly adjustable. In the tool slide 10 is provided a T-slot 14 and the top upper tool slide is usually flat as shown at 16. On this flat rests a base 18. A bore is provided through the base 18 and in this bore is located a bolt 20 having a T-head 22, and a nut 24. The nut 24 may be tightened to clamp the base 18 on to the top of the tool slide 10. As best shown in Figure 2 the base has substantially parallel walls 26 and 28 which define a slot 30 therein. A bore 32 is provided in wall 28. In this bore is fastened a pin 34. Appropriate means such as screw 36 is used to secure the pin in the bore. The other end 38 of the pin is made free by relieving a portion 40 of wall 26.

The invention contemplates the use of a bar 42 for carrying appropriate implements for use on the machine tool. The bar is of such width as to closely fit in the slot 30. One end of the bar has a bore 44 therein which bore closely fits upon bar 38. It can then readily be seen that the machine operator may take such a bar, hold it vertically relative to the base 18 as shown in Figure 1, slide the bore 44 of the bar 42 over the free end of pin 38, and slide the bar through the relieved portion 40 of wall 26 until the bar touches wall 28. Then the bar may be pivoted about pin 38 between the walls 26 and 28 until it is directed toward the work area of the machine tool. The bar is allowed to descend until its forward end touches the bottom wall 46 of the slot.

It can be readily seen that when in its operative position as shown in Figure 1, that the bar 42 has one degree of freedom with respect to the base 18. That is to say, that it is unrestrained in only one direction of movement, the direction which moves it out of operative position toward a position where it may be disengaged from pin 38. When the bar is moved upward from operative position it soon has three degrees of freedom i. e. toward the operative position, and away from the operative position pivoting around pin 38, and translating off of pin 38.

The bar may be used, as stated, to carry many different implements usable on a machine tool. Figures 1 and 2 show a bore 48 in the end of the bar. In the bore is located a post 50. This post 50 has upon its upper end a nut 52, which nut allows for vertical adjustment of the post relative to the bar. The post has a bore 54 in its center and a hole 56 in its lower end. The hole 56 is arranged to have a cutting tool inserted therein, while the bore 54 has a bolt 58 therein to clamp the cutting tool in hole 56. When the tool is properly adjusted relatively to the bar, it is clamped therein. It is to be noted that the bar is slotted at 60, and a clamping bolt 62 is arranged to clamp the post 50 in the bore 48.

Figure 3:
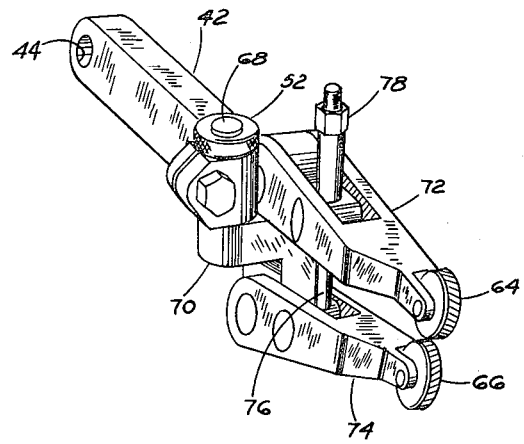
Figure 3 shows a bar carrying knurls to exemplify further use of the tool holder.

Other bars may be provided. Another example of a use of the tool holder is shown in Figure 3 wherein a bar 42 having a bore 44 is shown as carrying a pair of knurling wheels 64 and 66. These wheels are supported on the bar by a post 68 similar to post 50. On top of this post is a nut 52, and the bottom of the post is fitted into a vertical bracket 70. This bracket has adjustably pivoted therein a pair of arms 72 and 74 which carry journaled at their extremities the knurls 64 and 66, respectively. An appropriate adjustment is provided to clamp these knurls onto a work piece. This adjustment may be in the form of a threaded rod 76 attached to the lower arm 74. Upon the threaded portion of this rod 76 there is a nut 78 which presses down upon arm 72 to clamp the two arms together.

It can be readily seen that only two simple movements of the machine operator's hand are required to remove a bar carrying an implement used in the operation of the machine tool. Similarly, only two movements of his hand are required to place another implement in proper relation to the work in the base. The machinist, for example, can remove the cutting tool and then place a dial indicator or a knurl in the tool holder base, and then remove this latter implement and replace his cutting tool, whereupon his cutting tool will be back in the exact cutting relation with the work piece that it originally had.

By this invention it is possible to quickly and readily bring different tools and implements into operative position on the machine tool, in such a manner that they have the great rigidity required in machining.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

An implement holder for a machine tool having a work area, said implement holder comprising a base member adapted to be secured to the machine tool, walls in said base member defining a slot having a bottom, an open top and at least one open end, said open end being directable toward said work area, a pin mounted in one of said walls adjacent the end opposite said open end and positioned substantially perpendicularly to said one of said walls, said pin projecting away from said one of said walls toward said other wall, an elongated bar lying in said slot and being embraced by the walls thereof and resting on the bottom thereof having one end projecting beyond said open end, means on said open end for mounting a tool implement, walls in the other end of the bar defining a bore therethrough, said bore embracing said pin, the other wall defining said slot being sufficiently relieved adjacent said free projecting end of said pin, whereby when said bar is pivoted about said pin out of said slot it will provide clearance so that the other end of said bar may be translated off the end of said pin through the relieved portion of said other wall.

References Cited in the file of this patent

UNITED STATES PATENTS

| | | |
|---|---|---|
| 238,193 | Winslow | Feb. 22, 1881 |
| 1,394,628 | Kramer | Oct. 25, 1921 |
| 1,598,292 | Luck | Aug. 31, 1926 |
| 2,407,201 | Woodward | Sept. 3, 1946 |
| 2,453,722 | Moss | Nov. 16, 1948 |
| 2,571,530 | Brekke | Oct. 16, 1951 |

FOREIGN PATENTS

| | | |
|---|---|---|
| 238,879 | Switzerland | Dec. 3, 1945 |
| 575,247 | Great Britain | Feb. 8, 1946 |